United States Patent
Ejiri

(10) Patent No.: US 10,093,782 B2
(45) Date of Patent: Oct. 9, 2018

(54) THERMALLY FOAMABLE MICROSPHERE, METHOD OF PRODUCING THE SAME, AND USE THEREOF

(71) Applicant: KUREHA CORPORATION, Tokyo (JP)

(72) Inventor: Tetsuo Ejiri, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 15/435,846

(22) Filed: Feb. 17, 2017

(65) Prior Publication Data

US 2017/0158835 A1 Jun. 8, 2017

Related U.S. Application Data

(63) Continuation of application No. 14/273,356, filed on May 8, 2014, now Pat. No. 9,605,125, which is a continuation of application No. 12/086,627, filed as application No. PCT/JP2006/325164 on Dec. 18, 2006, now Pat. No. 8,759,410.

(30) Foreign Application Priority Data

Dec. 19, 2005 (JP) ................. 2005-364784

(51) Int. Cl.
| | |
|---|---|
| *C08J 9/14* | (2006.01) |
| *C08J 9/20* | (2006.01) |
| *C08F 220/06* | (2006.01) |
| *C08F 220/46* | (2006.01) |
| *C08J 9/16* | (2006.01) |

(52) U.S. Cl.
CPC ............... *C08J 9/20* (2013.01); *C08F 220/06* (2013.01); *C08F 220/46* (2013.01); *C08J 9/141* (2013.01); *C08J 9/16* (2013.01); *C08J 2203/14* (2013.01); *C08J 2333/02* (2013.01); *C08J 2333/20* (2013.01); *C08J 2333/24* (2013.01)

(58) Field of Classification Search
CPC ....... C08F 220/06; C08F 220/46; C08J 9/141; C08J 9/16; C08J 9/20; C08J 2203/14; C08J 2333/02; C08J 2333/20; C08J 2333/24
See application file for complete search history.

(56) References Cited

U.S. PATENT DOCUMENTS

| | | |
|---|---|---|
| 4,139,685 A | 2/1979 | Schroeder |
| 5,310,807 A | 5/1994 | Antonelli et al. |
| 5,714,560 A | 2/1998 | Denzinger et al. |
| 5,928,459 A | 7/1999 | Geyer et al. |
| 6,235,800 B1 | 5/2001 | Kyuno et al. |
| 2003/0114546 A1 | 6/2003 | Satake et al. |
| 2006/0063000 A1 | 3/2006 | Tokumura et al. |
| 2014/0243438 A1 | 8/2014 | Ejiri |

FOREIGN PATENT DOCUMENTS

| | | |
|---|---|---|
| EP | 1508604 A1 | 2/2005 |
| EP | 1577359 A1 | 9/2005 |
| EP | 1947121 A1 | 7/2008 |
| EP | 1952880 A1 | 8/2008 |
| JP | 62-286534 A | 12/1987 |
| JP | 10-306169 A | 11/1998 |
| JP | 2002-12693 A | 1/2002 |
| JP | 2005-343967 A | 12/2005 |
| JP | 2006-2133 A | 1/2006 |
| JP | 2006-2134 A | 1/2006 |
| WO | WO 99/43758 A1 | 9/1999 |
| WO | WO 03/099955 A1 | 12/2003 |
| WO | WO 2004/058910 A1 | 7/2004 |
| WO | WO 2007/046273 A1 | 4/2007 |
| WO | WO 2007/049616 A1 | 5/2007 |
| WO | WO 2007/072769 A1 | 6/2007 |

OTHER PUBLICATIONS

Extended European Search Report for Corresponding European Application No. 06842850.7 dated May 14, 2012.
International Search Report of PCT/JP2006/325164 dated Mar. 20, 2007.

*Primary Examiner* — Irina S Zemel
(74) *Attorney, Agent, or Firm* — Birch, Stewart, Kolasch & Birch, LLP

(57) ABSTRACT

This invention aims to provide a thermally foamable microsphere which is excellent in heat resistance, has a high expansion ratio, and shows stable foaming behavior; a method of producing the thermally foamable microsphere; and suitable use thereof.
This invention provides a thermally foamable microsphere in which an outer shell encapsulating a foaming agent is formed of a copolymer having a polymethacrylimide structure. In particular, this invention provides a thermally foamable microsphere in which monomers capable of forming the polymethacrylimide structure by a copolymerization reaction are methacrylonitrile and methacrylic acid. Moreover, this invention provides a method of producing the thermally foamable microsphere and use of the thermally foamable microsphere as an additive.

6 Claims, 2 Drawing Sheets

[Figure 1]
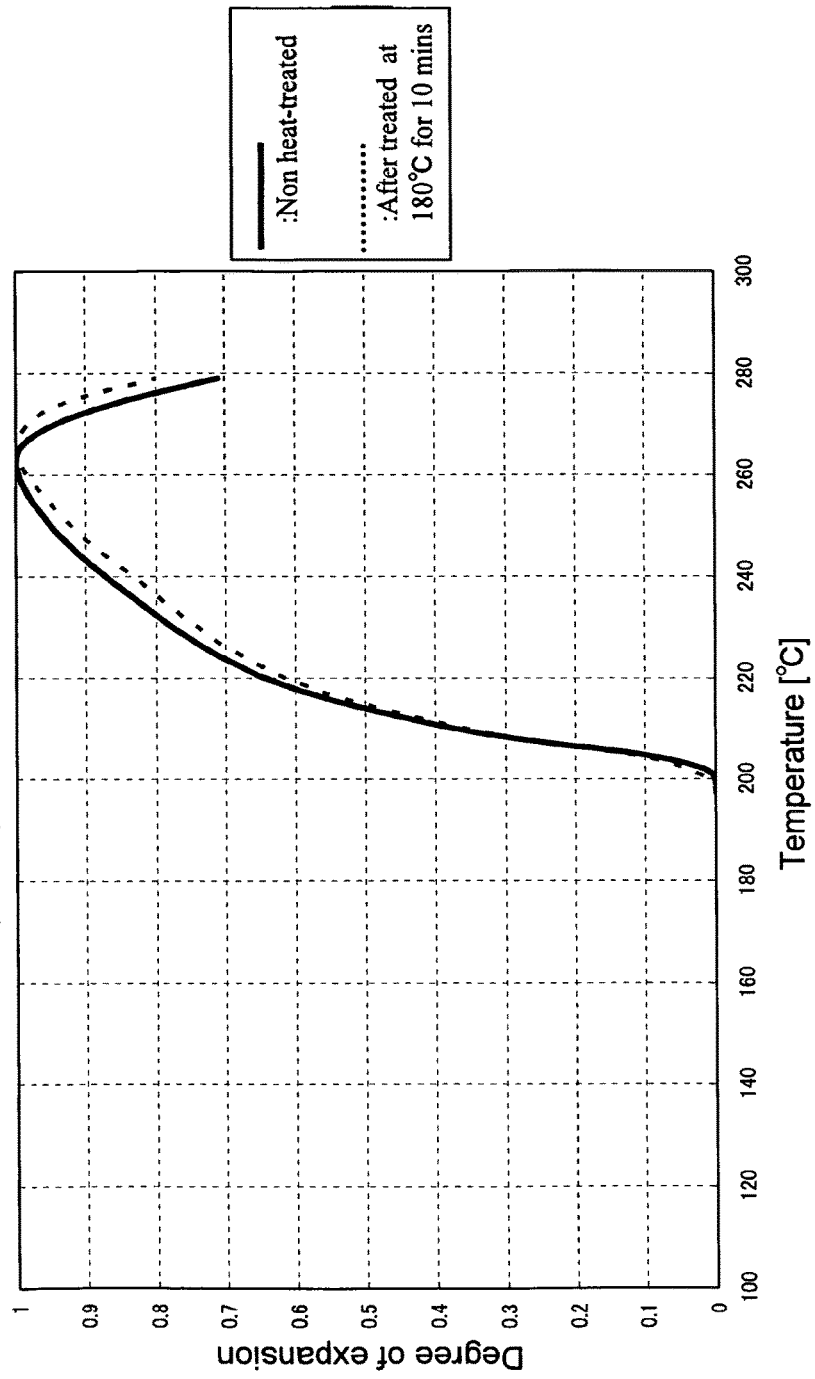

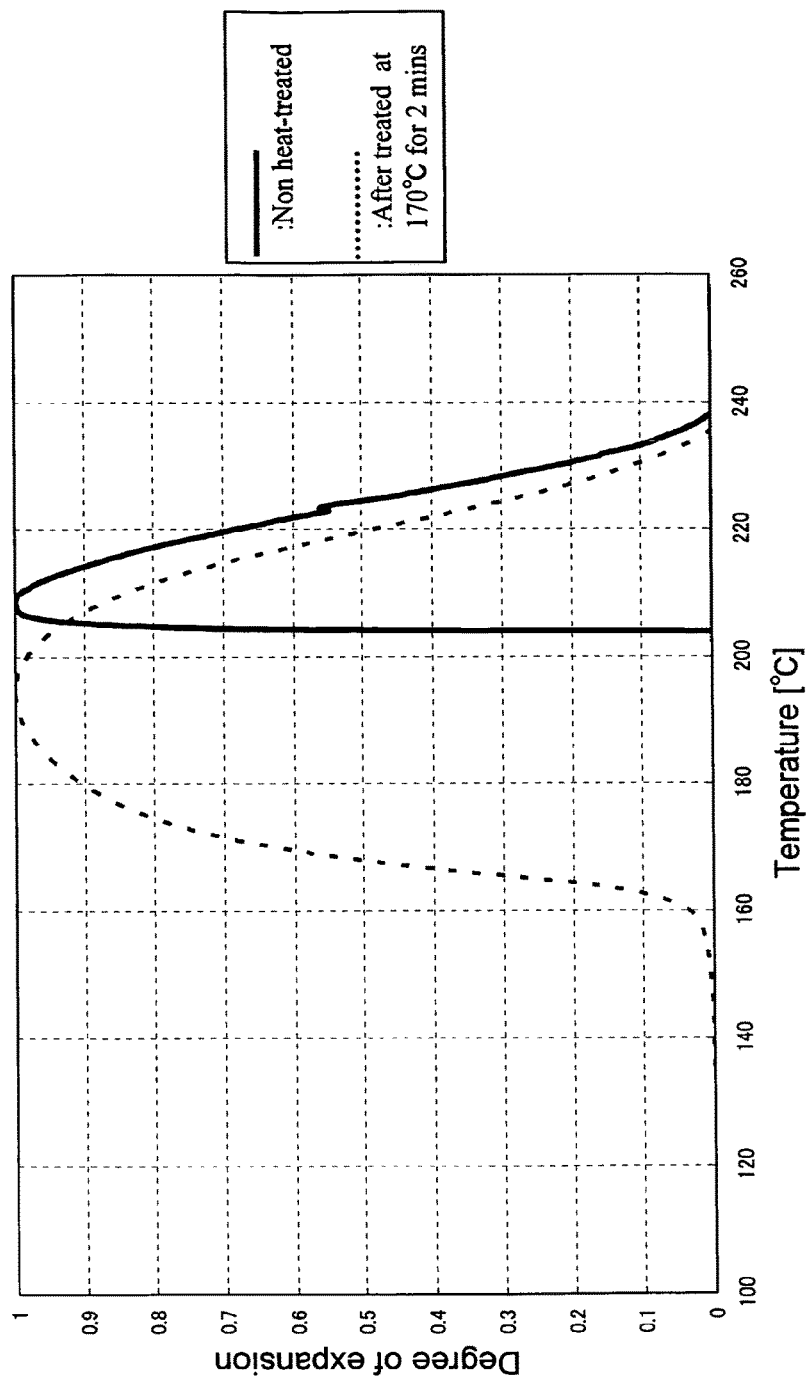

THERMALLY FOAMABLE MICROSPHERE, METHOD OF PRODUCING THE SAME, AND USE THEREOF

CROSS-REFERENCE TO RELATED APPLICATIONS

This application is a Continuation of application Ser. No. 14/273,356 filed on May 8, 2014. Application Ser. No. 14/273,356 is a Continuation of application Ser. No. 12/086,627 filed on Jun. 17, 2008 (now U.S. Pat. No. 8,759,410 which issued on Jun. 24, 2014), which is a National Phase of PCT International Application No. PCT/JP2006/325164 filed on Dec. 18, 2006, which claims priority under 35 U.S.C. § 119(a) to Patent Application No. 2005-364784 filed in Japan on Dec. 19, 2005.

TECHNICAL FIELD

The present invention relates to a technique on a thermally foamable microsphere. More specifically, the present invention relates to: a thermally foamable microsphere which is excellent in heat resistance, has a high expansion ratio, and shows stable foaming behavior; a method of producing the thermally foamable microsphere; and suitable use thereof.

BACKGROUND ART

The "thermally foamable microsphere" also referred to as a thermally expandable microcapsule is obtained by microencapsulating a volatile foaming agent with an outer shell formed of a polymer. In general, when suspension polymerization with a polymerizable mixture containing a polymerizable monomer and a foaming agent is allowed to proceed in an aqueous dispersion medium, an outer shell is formed in such a manner as to encapsulate the foaming agent.

As the polymer forming the outer shell, a thermoplastic resin with good gas barrier properties is generally used. The polymer forming the outer shell is softened with heat. As the foaming agent, a compound having a low boiling point, such as hydrocarbon, which becomes gas at a temperature equal to or lower than the softening point of the polymer forming the outer shell is generally used.

When the thermally foamable microsphere is heated, the foaming agent is vaporized to generate expanding force acting on the outer shell. Simultaneously, the elastic modulus of the polymer forming the outer shell drastically decreases, which causes rapid expansion at a certain critical temperature. This temperature is referred to as a "foaming starting temperature." When the thermally foamable microsphere is heated to a temperature equal to or higher than the foaming starting temperature, foamed particles (expanded and closed cells) are formed due to the expansion phenomenon. When further heated, the foaming agent transmits the outer shell, which has become thin, resulting in reduced internal pressure, which causes contraction of the foamed particles (shrinking phenomenon).

Utilizing the above-described properties which allows the formation of the foamed particles, the thermally foamable microsphere is applied to a wide variety of fields, such as a designability providing agent, a functionality providing agent, and a weight reducing agent. For example, the thermally foamable microsphere is added to a polymeric material, such as a synthetic resin (a thermoplastic resin and a thermosetting resin) and rubber, a coating composition, ink, etc., for use. When higher performance is required in each field to which the microsphere is applied, the demand level to the thermally foamable microsphere increases. Thus, for example, the improvement in the processing properties, such as heat resistance, is required.

However, in a conventional thermally foamable microsphere, the foaming starting temperature is generally within a narrow range and foaming starts at relatively low temperatures. Therefore, the thermally foamable microsphere is likely to develop premature foam at the time of processing, such as kneading or pelletization before foamed molding. Therefore, the processing temperatures need to be low, which limits the type of an applicable synthetic resin or rubber.

Conventionally, in order to obtain a thermally foamable microsphere usable at high temperatures, a thermally foamable microsphere has been proposed: which each comprises: a shell of a polymer obtained by the polymerization of acrylonitrile (I) as the main monomer, a monomer (II) having a carboxyl group, and a monomer (III) having a group reactive with the carboxyl group of the monomer (II); and encapsulated therein a liquid having a boiling point not higher than the softening point of the polymer (Patent Document 1). The foamed article obtained by the method has a feature of having a glass-like fragile outer shell. For this reason, the foamed article is completely different from one having elasticity. Thus, the properties of resin may be lost when producing a porous body whose shape varies.

Moreover, Patent Document 2 proposes a method of forming an outer shell resin of a thermally foamable microsphere from a polymer of a monomer mixture containing a nitril monomer (I), a monomer (II) having one unsaturated double bond and a carboxyl group in the molecule, a monomer (III) having two or more polymerizable double bonds in the molecule, and, as required, a monomer (IV) which can be copolymerized with the monomers. According to this method, the heat resistance can be increased. However, by the use of a monomer having two or more polymerizable double bonds in the molecule, a polymer takes a cross linkage structure, whereby the expansion ratio is suppressed. When acrylonitrile is used in a high proportion, aggregation occurs to form a lump in the middle of polymerization, which makes it difficult to secure manufacturability. Moreover, when acrylonitrile is used in a high proportion, yellowing is remarkable on heating.

Conventionally, polymethacrylimide is known as a polymeric material having high heat resistance, and a polyimide foam substance using such material is disclosed in Patent Document 3. The production method disclosed in Patent Document 3 refers to a method of heating and foaming a polymer plate after producing a foam substance, and does not refer to a method of producing a thermally foamable microsphere.

Patent Document 1: International Publication WO 99/43758
Patent Document 2: International Publication WO 03/099955
Patent Document 3: Japanese Laid-open Publication No. 10-306169

DISCLOSURE OF THE INVENTION

Technical Problems to be Solved

A main object of the present invention is to provide a thermally foamable microsphere which is excellent in heat resistance, has a high expansion ratio, and shows stable foaming behavior; a method of producing the thermally foamable microsphere; and suitable use thereof.

Means to Solve the Problems

In order to achieve the object, the present inventors conducted extensive research, and, as a result, found that by forming a copolymer capable of forming a polymethacrylimide structure into an outer shell, a thermally foamable microsphere which is excellent in heat resistance, has a high expansion ratio, and shows stable foaming behavior can be obtained.

Thus, in the present invention, the outer shell encapsulating the foaming agent first provides a thermally foamable microsphere capable of forming a copolymer having a polymethacrylimide (abbreviated as PMI) structure. More specifically, the thermally foamable microsphere of the present invention contains a foaming agent and an outer shell encapsulating the foaming agent thereinside; and has a structure capable of being formed by a copolymer in which the outer shell has the polymethacrylimide structure. As a suitable example of the monomer capable of forming the polymethacrylimide structure due to a copolymerization reaction, methacrylonitrile and methacrylic acid are mentioned.

The thermally foamable microsphere of the present invention has features that the b* value after heated at 240° C. for 2 minutes is 100 or lower and that the variations in the foaming starting temperature and the maximum foaming temperature due to heat treatment at temperatures lower than the foaming starting temperature are 7% or lower relative to the foaming starting temperature and the maximum foaming temperature before the heat treatment, respectively.

Next, the present invention provides a method of producing a thermally foamable microsphere in which a foaming agent is encapsulated in the outer shell capable of forming a copolymer having the polymethacrylimide structure by performing suspension polymerization of a mixture of monomers as main components comprised of a nitril monomer and a monomer having a carboxyl group in an aqueous dispersion medium containing a dispersion stabilizer in the presence of the foaming agent.

In the production method, methacrylonitrile can be used as the nitril monomer and methacrylic acid can be used as the monomer having a carboxyl group. More specifically, the mixture of a polymerizable monomer is designed to contain at least: a substance in which the molar ratio of methacrylonitrile to methacrylic acid is 1:9 to 9:1 in a proportion of 70 to 100% by weight; a vinyl monomer capable of being copolymerized therewith in a proportion of 0 to 30% by weight; and a cross-linkable monomer having two or more functionalities in a proportion of 0 to 0.4 mol %, and more preferably 0 to 0.3 mol %.

Furthermore, the present invention provides use of the above-described thermally foamable microsphere as an additive. The thermally foamable microsphere of the present invention has features that the foaming starting temperature can be sufficiently raised. Therefore, undesirable premature foaming can be effectively suppressed when heated to high temperatures at the time of mixing with various synthetic resins, rubber, and a binder resin. Moreover, even after heated, the thermally foamable microsphere of the present invention shows maintained stable foaming behavior; has high expansion ratio; and shows less shrinking. Therefore, the addition amount thereof can be reduced and a broad processing window can be achieved.

Effect of the Invention

The present invention can provide a thermally foamable microsphere which is excellent in heat resistance, has a high expansion ratio, and shows a stable foaming behavior. Moreover, the present invention can provide a thermally foamable microsphere whose processing temperature before foaming can be increased, and, in addition thereto, whose foaming starting temperature does not lower even after heat treated.

Furthermore, the present invention can provide a thermally foamable microsphere with little yellowing at the time of heating. Moreover, the present invention can stably produce a thermally foamable microsphere while causing no aggregation in the middle of polymerization.

BEST MODE FOR CARRYING OUT THE INVENTION

Hereinafter, embodiments of the present invention will be described. The scope of the present invention is not narrowly limited by Embodiments or Examples which will be described below.

A thermally foamable microsphere of the present invention has features of containing a foaming agent and an outer shell encapsulating the foaming agent thereinside, in which the outer shell has a structure capable of foaming a copolymer having a polymethacrylimide structure.

The "polymethacrylimide structure" can be obtained by cyclizing a nitrile group and a carboxyl group by heating or the like. Thus, as a monomer for forming the outer shell, a nitril monomer and a monomer having a carboxyl group are main components.

As the "nitril monomer", methacrylonitrile is used as a main component and, as required, acrylonitrile, α-chloroacrylonitrile, α-ethoxyacrylonitrile, fumaronitrile, etc., may be used together.

As the "monomer having a carboxyl group", methacrylic acid is used as a main component and, as required, acrylic acid, itaconic acid, crotonic acid, maleic acid, maleic anhydride, fumaric acid, citraconic acid, etc., may be used together.

The molar ratio of methacrylonitrile to methacrylic acid is 1:9 to 9:1, more preferably 1:5 to 5:1, and still more preferably 1:3 to 3:1. Besides methacrylonitrile and methacrylic acid, a vinyl monomer capable of copolymerized therewith may be used. These substances are used for adjusting the foaming properties of a polymer of the outer shell. When the molar ratio of methacrylonitrile to methacrylic acid is lower than 1:9, the particle formation ability is lowered, agglomeration occurs during polymerization, and while the molar ratio of methacrylonitrile to methacrylic acid exceeds 9:1, yellowing on heating is remarkable and the heat resistance is deteriorated.

Mentioned as the "vinyl monomer" are: vinylidene chloride; vinyl acetate; (meth)acrylic acid ester, such as methyl (meth)acrylate, ethyl(meth)acrylate, n-butyl(meth)acrylate, isobutyl(meth)acrylate, t-butyl(meth)acrylate, isobornyl (meth)acrylate, cyclohexyl(meth)acrylate, benzyl(meth) acrylate, and β-carboxy ethyl acrylate; styrene monomers, such as styrene, styrene sulfonic acid or sodium salts thereof, α-methyl styrene, and chlorostyrene; monomers in which a polymerization reaction proceeds by a radical initiator, such as acrylamide, substituted acrylamide, methacrylamide, and substituted methacrylamide; and mixtures thereof. The above-mentioned copolymerizable vinyl monomers can be used in a proportion of about 0 to 30% by weight. When the vinyl monomer exceeds 30% by weight, the effect of polymethacrylimide decreases.

In the present invention, a polymethacrylimide structure is formed through the cyclization of a nitrile group and a carboxyl group. Therefore, the use of a cross-linkable monomer is not essential. However, when using a cross-linkable monomer, a polyfunctional monomer having two or more polymerizable carbon-carbon double bonds (—C=C—) is preferable. As the polymerizable carbon-carbon double bond, a vinyl group, a methacrylic group, an acrylic group, and an allyl group are mentioned. The two or more polymerizable carbon-carbon double bonds each may be the same or different. Or, two or more different cross-linkable monomers may be used.

Mentioned as a more specific example of the "cross-linkable monomer" are: aromatic divinyl compounds, such as divinylbenzene, divinylnaphthalene, and derivatives thereof; diethylene unsaturated carboxylic acid ester, such as ethylene glycol diacrylate, diethylene glycol diacrylate, ethylene glycol dimethacrylate, and diethylene glycol dimethacrylate; polyethylene unsaturated carboxylic acid ester, such as triethylene glycol diacrylate and triethylene glycol dimethacrylate; acrylate or methacrylate derived from aliphatic terminated alcohol having alcoholic groups at both ends, such as 1,4-butanediol and 1,9-nonanediol; and a cross-linkable monomer having two functionalities such as a divinyl compound or the like (e.g., N,N-divinylaniline and divinyl ether). Mentioned as other cross-linkable monomers are, for example, polyfunctional cross-linkable monomers having three or more functionalities, such as trimethylolpropane triacrylate, trimethylolpropane trimethacrylate, pentaerythritol triacrylate, pentaerythritol trimethacrylate, and triacrylformal; and triallyl cyanurate or triallyl isocyanurate. A suitable addition amount of the cross linking agent is 0 to 0.4 mol %, and more preferably 0 to 0.3 mol %. When the cross linking agent is used in a proportion exceeding 0.4 mol %, the expansion ratio is sharply reduced.

Next, mentioned as the "foaming agent" encapsulated in the above-mentioned outer shell are: hydrocarbons, such as methane, ethane, propane, n-butane, isobutane, n-pentane, isopentane, neopentane, n-hexane, isohexane, n-heptane, isoheptane, n-octane, isooctane, n-nonane, isononane, n-decane, isodecane, n-dodecane, and isododecane; chlorofluorocarbon, such as CCl3F; tetraalkylsilanes, such as tetramethylsilane. These foaming agents can also be used singly or in combination of two or more members in accordance with the object or intended use. Moreover, a chemical foaming agent can also be used together.

The proportion of the foaming agent encapsulated in the thermally foamable microsphere is generally 5 to 50% by weight, and preferably 7 to 40% by weight based on the total amount. Therefore, it is preferable to adjust the proportion of each of the polymerizable monomer and the foaming agent in such a manner that the proportion of each of an outer shell polymer and the foaming agent is within the above-mentioned range after polymerization.

Hereinafter, a method of producing the thermally foamable microsphere of the present invention will be described.

First, the thermally foamable microsphere having the above-mentioned structure can be generally produced by performing suspension polymerization of a polymerizable mixture in an aqueous dispersion medium containing a dispersion stabilizer in the presence of a foaming agent.

More specifically, a polymerizable monomer mixture containing at least a polymerizable monomer and a foaming agent is dispersed in an aqueous dispersion medium to thereby form a droplet of an oil-based polymerizable monomer. This process may be referred to as a "particle formation process."

In the particle formation process of the present invention, the polymerizable monomer mixture capable of forming a polymethacrylimide structure and an aqueous dispersion medium are stirred and mixed to thereby form a droplet of the polymerizable monomer mixture in the aqueous dispersion medium.

It is preferable to adjust the average particle diameter of the droplet to be substantially the same as the average particle diameter of the target thermally foamable microsphere. The average particle diameter of the droplet is generally 1 to 500 µm, preferably 3 to 300 µm, and particularly preferably 5 to 200 µm.

In order to obtain a thermally foamable microsphere having an extremely sharp particle size distribution, it is preferable to employ a method which involves: supplying an aqueous dispersion medium and a polymerizable monomer mixture into a continuous high speed high-shear type stirring and dispersing machine; successively stirring both of them in the stirring dispersion apparatus for dispersion; pouring the obtained dispersion into a polymerization tank; and performing suspension polymerization in the polymerization tank.

When suspension polymerization of the polymerizable monomer is performed using a polymerizable initiator following the droplet formation, a thermally foamable microsphere having a structure in which the foaming agent is encapsulated in the outer shell formed of a produced polymer can be obtained through the suspension polymerization.

The "suspension polymerization" is generally performed by degassing the inside of the reaction chamber or replacing the inside of the reaction chamber with inert gas, and then increasing the temperature to 30 to 100° C. During the suspension polymerization, the polymerization temperature may be controlled to a fixed temperature or may be gradually increased for polymerization. After the suspension polymerization, the reaction mixture containing the generated thermally foamable microsphere is subjected to filtration, centrifugal separation, sedimentation or the like, to thereby isolate the thermally foamable microsphere from the reaction mixture. The isolated thermally foamable microsphere is washed and filtered, and then collected in the state of a wet cake. The surface of the thermally foamable microsphere can also be coated with various materials as required.

As a "polymerization initiator" for suspension polymerization, polymerization initiators, which are generally used in this technical field, can be used. An oil soluble polymerization initiator which is soluble in the polymerizable monomer is preferable. Mentioned as such a polymerization initiator are, for example, hyperoxidation dialkyl, hyperoxidation diacyl, peroxy ester, peroxy dicarbonate, and azo compounds.

More specific examples of the polymerization initiator include: dialkyl peroxide, such as methylethyl peroxide, di-t-butyl peroxide, and dicumyl peroxide; diacyl peroxide, such as isobutyl peroxide, benzoyl peroxide, 2,4-dichlorobenzyl peroxide, 3,5,5-trimethylhexanoyl peroxide; peroxy ester, such as t-butyl peroxypivalate, t-hexyl peroxypivalate, t-butyl peroxyneodecanoate, t-hexyl peroxyneodecanoate, 1-cyclohexyl-1-methylethyl peroxyneodecanoate, 1,1,3,3-tetramethylbutyl peroxyneodecanoate, cumil peroxyneodecanoate, and (α,α-bis-neodecanolyperoxy)diisopropylbenzene; peroxydicarbonate, such as bis(4-t-butylcyclohexyl)peroxydicarbonate, di-n-propyloxydicarbonate, diisopropyl peroxydicarbonate, di(2-ethylethylperoxy)dicarbonate, dimethoxy butyl peroxydicarbonate, di(3-methyl-3-methoxybutylperoxy)dicarbonate; azo compounds, such as 2,2'-azobisisobutyronitrile, 2,2'-azobis(4-methoxy)-2,4-dimethylvaleronitrile, 2,2'-azobis(2,4-dimethylvaleronitrile), and 1,1'-azobis(1-cyclohexanecarbonitrile); etc.

The polymerization initiator is generally blended in the polymerizable monomer mixture. However, when premature polymerization needs to be suppressed, a part or the whole of the polymerization initiator may be added to the aqueous dispersion medium during or after the particle formation process to thereby transfer the polymerization initiator into the droplet of the polymerizable monomer mixture. The polymerization initiator is generally used in a proportion of 0.0001 to 3% by weight based on the weight of the polymerizable monomer.

The suspension polymerization is generally performed in the aqueous dispersion medium containing a dispersion stabilizer. As the dispersion stabilizer, inorganic particles, such as silica and magnesium hydroxide, can be mentioned, for example. As an auxiliary stabilizer, a condensation product of diethanolamine and an aliphatic dicarboxylic acid, polyvinyl pyrrolidone, polyethylene oxide, various emulsifiers, etc. can be used, for example. The dispersion stabilizer is generally used in a proportion of 0.1 to 20 parts by weight based on 100 parts by weight of the polymerizable monomer.

The aqueous dispersion medium containing the dispersion stabilizer is generally prepared by blending a dispersion stabilizer and an auxiliary stabilizer to deionized water. The pH of the aqueous phase at the time of polymerization is suitably determined depending on the type of the dispersion stabilizer or auxiliary stabilizer to be used. For example, when silica, such as colloidal silica, is used as the dispersion stabilizer, polymerization is performed in an acid environment. An acid aqueous dispersion medium is obtained by adding acid, as required, to the aqueous dispersion medium to thereby adjust the pH of the reaction system to 6 or lower, and preferably about 3 to 4. In the case of the dispersion stabilizer which dissolves in the aqueous dispersion medium in an acid environment, such as magnesium hydroxide and calcium phosphate, polymerization is performed in an alkaline environment.

As one of suitable possible combinations of the dispersion stabilizers, combination of colloidal silica and a condensation product is mentioned. As the condensation product, a condensation product of diethanolamine and an aliphatic dicarboxylic acid is preferable. In particular, a condensate of diethanolamine and adipic acid and a condensation product of diethanolamine and itaconic acid are preferable. The acid value of the condensation product is preferably 60 or higher and lower than 95, and more preferably 65 to 90.

Furthermore, when mineral salt, such as sodium chloride and sodium sulfate, is added, a thermally foamable microsphere having a more uniform particle shape is likely to be obtained. As the mineral salt, salt is generally preferable.

The used amount of the above-mentioned colloidal silica changes depending on the particle diameter, and is generally 0.5 to 20 parts by weight, and preferably 1 to 15 parts by weight based on 100 parts by weight of the polymerizable monomer. The condensation product is used generally in a proportion of 0.05 to 2 parts by weight based on 100 parts by weight of the polymerizable monomer. The mineral salt is used in a proportion of 0 to 100 parts by weight based on 100 parts by weight of the polymerizable monomer.

As one of other preferable possible combinations of dispersion stabilizers, combination of colloidal silica and a water-soluble nitrogen containing substance is mentioned. Among such combinations, combination of colloidal silica and polyvinyl pyrrolidone is preferably used. Furthermore, as other preferable possible combinations, combination of magnesium hydroxide and/or calcium phosphate and an emulsifier is mentioned.

As the "dispersion stabilizer", colloid of a metal hydroxide which is hard to dissolve in water (e.g., magnesium hydroxide) obtained by a reaction, in the aqueous phase, of a water-soluble polyvalent metal salt compound (e.g., magnesium chloride) with alkali metal hydroxide (e.g., sodium hydroxide) can be used. As calcium phosphate, a reaction product in the aqueous phase of sodium phosphate and calcium chloride can be used.

Although an "emulsifier" is not generally used, but, as desired, anionic surfactants, such as dialkyl sulfosuccinate and phosphoric acid ester of polyoxyethylene alkyl(allyl) ether may be used.

As a "polymerization aid", at least one type of compound selected from the group consisting of alkali metal nitrite, stannous chloride, stannic chloride, water-soluble ascorbic acids, and boric acids can be made to exist in the aqueous dispersion medium. When suspension polymerization is performed in the presence of the above-mentioned compounds, aggregation of polymerization particles does not occur and the polymerized substance does not attach to the wall of a polymerization at the time of polymerization, whereby a thermally foamable microsphere can be stably produced while efficiently removing heat caused by polymerization.

Among alkali metal nitrites, sodium nitrite and potassium nitrite are preferable in terms of the ease of availability and price. As the ascorbic acids, ascorbic acid, metal salt of ascorbic acid, ester of ascorbic acid, etc., are mentioned, and water-soluble ascorbic acids are preferably used among the above. Here, the water-soluble ascorbic acids refer to water-soluble ascorbic acids whose solubility in 23° C. water is 1 g/100 cm$^3$ or higher. Among the above, L-ascorbic acid (vitamin C), sodium ascorbate, and potassium ascorbate are particularly preferably used in terms of the ease of availability, price, and an operation effect.

The polymerization assistant containing one or more of the above-mentioned compounds is used in a proportion of generally 0.001 to 1 part by weight, and preferably 0.01 to 0.5 part by weight based on 100 parts by weight of the polymerizable monomer.

The order of adding each of the above-mentioned components to the aqueous dispersion medium is suitably determined. In general, water and the dispersion stabilizer, and, as required, the stabilizer assistant, the polymerization assistant, etc., are added to thereby prepare the aqueous dispersion medium containing the dispersion stabilizer.

The foaming agent, polymerizable monomer (vinyl monomer), and cross-linkable monomer may be separately added to the aqueous dispersion medium and unified in the aqueous dispersion medium to form a polymerizable monomer mixture (oil-based mixture). In general, the foaming agent, polymerizable monomer (vinyl monomer), and cross-linkable monomer are mixed beforehand, and then the mixture is added to the aqueous dispersion medium. The polymerization initiator can be added beforehand to the polymerizable monomer for use.

When premature polymerization needs to be avoided, for example, the polymerizable monomer mixture may be added to the aqueous dispersion medium, and then the polymerization initiator may be added under stirring to be unified in the aqueous dispersion medium. The polymerizable monomer mixture and the aqueous dispersion medium may be mixed in another container, mixed and stirred with a stirrer or a disperser having high shearing force, and then charged in a polymerization can.

The thermally foamable microsphere obtained by the above-described production method has a structure in which the foaming agent is encapsulated in the outer shell formed of a polymer and the outer shell has a polymethacrylimide structure. This polymethacrylimide structure is acquired by cyclizing a nitrile group and a carboxyl group under heat or the like.

However, there may arise a problem with yellowing and coloring at the time of heating. The problem is caused by thermal denaturation of a nitrile group. Therefore, in order to improve heat yellowing resistance, it is preferable to increase the molar ratio of a carboxyl group.

As an index showing a yellowing degree, a "$b^*$ value" in the $L^*a^*b^*$ color system is used. When the $b^*$ value is higher, the yellowing degree increases, and when the $b^*$ value is lower, blue color tone becomes strong. For example, when the thermally foamable microsphere is used for reducing the weight of a sole of a shoe, a titanium oxide is used for a white sole. When yellowing is remarkable, a large amount of titanium oxide needs to be used. Thus, the $b^*$ value is 100 or lower, and more preferably 50 or lower.

The softening temperature of the outer shell resin can be adjusted by changing the proportion of methacrylonitrile and methacrylic acid. When the softening temperature needs to be lowered, the proportion of methacrylonitrile is increased, while when the softening temperature needs to be increased, the proportion of methacrylic acid is increased. By changing the softening temperature of the outer shell resin, it becomes possible to suitably adjust the foaming starting temperature.

As a method of adjusting the expanding starting temperature, it is also effective to change the type of foaming agent. The expanding starting temperature can also be increased by increasing the proportion of the foaming agent having a high boiling point. When an outer shell resin of a conventional thermally foamable microsphere is heated at temperatures slightly lower than the expanding starting temperature, the expanding starting temperature is lowered. However, the outer shell resin of the thermally foamable microsphere of the present invention has features that, when heated at temperatures slightly lower than the expanding starting temperature, the expanding starting temperature is not lowered and the foaming behavior is stable. More specifically, the variations in the expanding starting temperature and the maximum expansion temperature by heat treatment at temperatures lower than the expanding starting temperature are 7% or lower relative to the expanding starting temperature and the maximum expansion temperature before the heat treatment, respectively. Furthermore, the variations are preferably 5% or lower, and more preferably 3% or lower.

Here, the use of the thermally foamable microsphere of the present invention is not limited narrowly. The thermally foamable microsphere of the present invention is used in various fields after it is foamed (expanded) or as it is kept unfoamed. For example, making good use of its expandability, the thermally foamable microsphere of the present invention is used as a filler for a paint for automobiles and the like, a foaming agent for wallpaper or foaming ink (for applying relief patterns to T-shirt and the like), a shrink-preventing agents, etc. In particular, the present invention contributes to reducing the weight of interior members or tires of automobiles.

Moreover, utilizing the volume increase caused by foaming, the thermally foamable microsphere of the present invention is used as an additive for the purpose of reducing the weight of polymeric materials such as a synthetic resin (thermoplastic resin, thermosetting resin) and rubber, a paint and various materials making them porous and imparting various functionalities (e.g., slipping properties, heat insulation properties, cushioning properties, sound insulation properties, etc.). As the polymeric material, polyethylene, polypropylene, polystyrene, ABS resin, SBS, SIS, hydrogenated SIS, natural rubber, various synthetic rubbers, thermoplastic polyurethane, etc., are mentioned.

Furthermore, the thermally foamable microsphere of the present invention can be suitably used for the fields of a coating composition, wallpaper, and ink, which are requiring surfaceness and smoothness. The thermally foamable microsphere of the present invention is excellent in processability, and therefore can be suitably used for the fields requiring processing, such as kneading, calendering, extruding, and injection molding.

Thus, the thermally foamable microsphere of the present invention can be used as a foaming agent or can be mixed with a polymeric material to form a composition. Or, the thermally foamable microsphere of the present invention can be molten and kneaded, while not foamed, with a thermoplastic resin to be pelletized, and further can be blended in a polymeric material, a coating composition, ink, etc., and foamed under heat to form articles containing foamed particles (e.g., a foaming molded article, a foamed coating film, foamed ink).

EXAMPLES

Hereinafter, the present invention will be described with reference to Examples and Comparative Examples. First, the "measurement method" of each parameter will be described.
(1) Expanding Starting Temperature and Maximum Expansion Temperature Using the TMA-7 model manufactured by PerkinElmer, Inc., "TMA measurement" was performed. About 0.25 mg of a sample was used, and the temperature was increased at a temperature increase rate of 5° C./minute. Then, the foaming behavior was observed. More specifically, a sample (thermally foamable microsphere) was put in a container, and the temperature was increased at a temperature increase rate of 5° C./minute. Then, the variation in the height was successively measured. The temperature at which the variation in the height of the sample in the container started was defined as a expanding starting temperature (Tstart) and the temperature at which the height became a maximum was defined as a maximum expansion temperature (Tmax).
(2) Expansion Ratio (Film Coating Method)

To an EVA aqueous emulsion (Concentration: 55% by weight) containing ethylene-vinylacetate copolymer (EVA; ethylene/vinyl acetate=30/70% by weight), the thermally foamable microsphere was added in such a manner that the ratio of the thermally foamable microsphere to the EVA aqueous emulsion was 5:1 in terms of solid content to prepare a coating liquid. The coating liquid was applied to a double-sided art paper by a coater having a gap of 200 μm, and then the resulting product was put in an oven to dry at 90° C. for 5 minutes. The thickness of the coating film after drying was measured. Then, the coating film was put in an oven having a given temperature to heat for 2 minutes for foaming. The thickness of the coating film after foaming was measured, and then the expansion ratio was determined from the coating-film pressure ratio before and after foaming.

(3) Average Particle Diameter

The average particle diameter was measured using a particle size distribution meter SALD-3000J manufactured by Shimadzu Corp.

(4) Measurement of Color Tone

The b* value of the coating film, whose expansion ratio (Film coating method) was measured, was measured using a color difference meter (Color difference meter CR-200, manufactured by Minolta Co., Ltd.). The b* value refers to a b* value of the L*a*b* color system. When the b* value is larger, yellow color tone is strong.

(5) Foamed Particle Density 0.5 g of microsphere and 2.5 g of silicon oil were weighed out and put in an aluminum cup. After sufficiently mixing, the mixture was foamed under heat in an oven having a given temperature, and then the resultant was taken out. Then, the resultant was put in a 50 ml volumetric flask, and isopropanol was added. Then, the true specific gravity of the foamed microsphere was determined from the sample weight and the flask weight after the addition of isopropanol.

Example 1

(A) Preparation of Aqueous Dispersion Medium 40 g of 20% by weight colloidal silica, 1.6 g of 50% by weight diethanolamine-adipic acid condensation product (Acid value=78 mgKOH/g), 0.12 g of sodium nitrite, 177 g of sodium chloride, and 565 g of water were mixed. Then, hydrochloric acid was added so that the pH was adjusted to 3.2 to thereby prepare an aqueous dispersion medium.

(B) Preparation of Polymerizable Mixture 88 g of methacrylonitrile, which is a polymerization monomer (indicated as MAN in Tables), 112 g of methacrylic acid (similarly indicated as MAA in Tables), 60 g of isooctane as a foaming agent, and 2 g of 2,2'-azobisisobutyronitril (similarly indicated as V-60 in Tables) as a polymerization initiator were mixed to prepare a polymerizable mixture. In Example 1, the molar ratio of methacrylonitrile to methacrylic acid was 1:1 (see Table 1).

(C) Suspension Polymerization

The aqueous dispersion medium and the polymerizable mixture prepared above were mixed by stirring with a homogenizer to thereby form a minute droplet of the polymerizable monomer mixture in the aqueous dispersion medium. The aqueous dispersion medium containing the minute droplet of the polymerizable mixture was charged in a polymerization can with a stirrer (1.5 L), heated at 60° C. for 15 hours using a hot water bath, and further heated at 70° C. for 9 hours for reaction. After polymerization, a slurry containing the generated thermally foamable microsphere was filtered and washed with water, and dried to thereby obtain a thermally foamable microsphere having an average particle diameter of 40 μm (see Table 1).

(D) Evaluation of Foaming Ability

The TMA measurement was performed using, as a sample, the thermally foamable microsphere obtained above as it was. As a result, the expanding starting temperature was 195° C., the maximum expansion temperature was 217° C., and the difference therebetween was 22° C. The thermally foamable microsphere was heated at 170° C. for 2 minutes, and then the TMA measurement was performed. No changes in both the expanding starting temperature and the maximum expansion temperature were observed. The expansion ratio was 8.4 times at 230° C. (see Table 1).

(E) Measurement of Color Tone

The b* value of the coating film which was heated at 240° C. for 2 minutes to foam in (D) above was 24.5 (see Table 1).

Example 2

Suspension polymerization was performed in the same manner with Example 1 except using 110 g of methacrylonitrile and 90 g of methacrylic acid to thereby obtain a thermally foamable microsphere with an average particle diameter of 39 μm. In Example 2, the molar ratio of methacrylonitrile to methacrylic acid was 1.6:1.

The TMA measurement was performed using, as a sample, the thermally foamable microsphere obtained as a result of the above manner as it was. As a result, the expanding starting temperature was 186° C., the maximum expansion temperature was 214° C., and the difference therebetween was 28° C. The expansion ratio was 8.4 times at 230° C. and the b* value was 26.8.

Example 3

Suspension polymerization was performed in the same manner with Example 1 except using 132 g of methacrylonitrile and 68 g of methacrylic acid to thereby obtain a thermally foamable microsphere with an average particle diameter of 41 μm. In Example 3, the molar ratio of methacrylonitrile to methacrylic acid was 2.5:1.

The TMA measurement was performed using, as a sample, the thermally foamable microsphere obtained as a result of the above manner as it was. As a result, the expanding starting temperature was 171° C., the maximum expansion temperature was 255° C., and the difference therebetween was 84° C. The expansion ratio was 10.5 times at 220° C. and the b* value was 27.1.

Example 4

Suspension polymerization was performed in the same manner with Example 1 except using 154 g of methacrylonitrile and 46 g of methacrylic acid to thereby obtain a thermally foamable microsphere with an average particle diameter of 50 μm. In Example 4, the molar ratio of methacrylonitrile to methacrylic acid was 4.3:1.

The TMA measurement was performed using, as a sample, the thermally foamable microsphere obtained as a result of the above manner as it was. As a result, the expanding starting temperature was 180° C., the maximum expansion temperature was 260° C., and the difference therebetween was 80° C. The expansion ratio was 8.6 times at 220° C. and the b* value was 35.4.

Example 5

Suspension polymerization was performed in the same manner with Example 1 except using 60 g of isopentane in place of 60 g of isooctane as the foaming agent to thereby obtain a thermally foamable microsphere with an average particle diameter of 40 μm.

The TMA measurement was performed using, as a sample, the thermally foamable microsphere obtained as a result of the above manner as it was. As a result, the expanding starting temperature was 185° C., the maximum expansion temperature was 240° C., and the difference therebetween was 55° C. The expansion ratio was 4.5 times at 230° C. and the b* value was 25.0.

Example 6

Suspension polymerization was performed in the same manner with Example 2 except using 60 g of isopentane in place of 60 g of isooctane as the foaming agent to thereby obtain a thermally foamable microsphere with an average particle diameter of 49 μm.

The TMA measurement was performed using, as a sample, the thermally foamable microsphere obtained as a result of the above manner as it was. As a result, the expanding starting temperature was 170° C., the maximum expansion temperature was 240° C., and the difference therebetween was 70° C. The expansion ratio was 9.1 times at 220° C. and the b* value was 27.0.

Example 7

Suspension polymerization was performed in the same manner with Example 3 except using 60 g of isopentane in place of 60 g of isooctane as the foaming agent to thereby obtain a thermally foamable microsphere with an average particle diameter of 47 μm.

The TMA measurement was performed using, as a sample, the thermally foamable microsphere obtained as a result of the above manner as it was. As a result, the expanding starting temperature was 155° C., the maximum expansion temperature was 220° C., and the difference therebetween was 65° C. The expansion ratio was 19.2 times at 210° C. and the b* value was 27.5.

Example 8

Suspension polymerization was performed in the same manner with Example 4 except using 60 g of isopentane in place of 60 g of isooctane as the foaming agent to thereby obtain a thermally foamable microsphere with an average particle diameter of 50 μm.

The TMA measurement was performed using, as a sample, the thermally foamable microsphere obtained as a result of the above manner as it was. As a result, the expanding starting temperature was 130° C., the maximum expansion temperature was 210° C., and the difference therebetween was 80° C. The expansion ratio was 17.3 times at 200° C. and the b* value was 36.0.

Example 9

Suspension polymerization was performed in the same manner with Example 3 except using 60 g of isododecane in place of 60 g of isooctane as the foaming agent to thereby obtain a thermally foamable microsphere with an average particle diameter of 31 μm.

The TMA measurement was performed using, as a sample, the thermally foamable microsphere obtained as a result of the above manner as it was. As a result, the expanding starting temperature was 251° C., the maximum expansion temperature was 279° C., and the difference therebetween was 28° C. The expansion ratio was 1.5 times at 230° C. and the b* value was 28.0.

Example 10

Suspension polymerization was performed in the same manner with Example 1 except using 130 g of methacrylonitrile, 66 g of methacrylic acid, and 4 g of methyl acrylate (indicated as MA in Tables) in place of 88 g of methacrylonitrile and 112 g of methacrylic acid to thereby obtain a thermally foamable microsphere with an average particle diameter of 34 μm.

The TMA measurement was performed using, as a sample, the thermally foamable microsphere obtained as a result of the above manner as it was. As a result, the expanding starting temperature was 171° C., the maximum expansion temperature was 245° C., and the difference therebetween was 74° C. The expansion ratio was 10.0 times at 220° C. and the b* value was 27.0.

Example 11

Suspension polymerization was performed in the same manner with Example 10 except using 60 g of isopentane in place of 60 g of isooctane as the foaming agent to thereby obtain a thermally foamable microsphere with an average particle diameter of 50 μm.

The TMA measurement was performed using, as a sample, the thermally foamable microsphere obtained as a result of the above manner as it was. As a result, the expanding starting temperature was 150° C., the maximum expansion temperature was 220° C., and the difference therebetween was 70° C. The expansion ratio was 19.1 times at 210° C. and the b* value was 26.9.

The TMA measurement was performed using, as a sample, the thermally foamable microsphere obtained as a result of the above manner as it was. As a result, the expanding starting temperature was 171° C., the maximum expansion temperature was 250° C. or higher, and the difference therebetween was 79° C. or higher. The expansion ratio was 10.2 times at 220° C. and the b* value was 27.0.

Example 13

(A) Preparation of Aqueous Dispersion Medium 65 g of 20% by weight colloidal silica, 6.5 g of 50% by weight diethanolamine-adipic acid condensation product (Acid value=78 mgKOH/g), 0.24 g of sodium nitrite, 0.04 g of stannous chloride, 177 g of sodium chloride, and 565 g of water were mixed. Then, hydrochloric acid was added so that the pH was adjusted to 3.2 to thereby prepare an aqueous dispersion medium.

(B) Preparation of Polymerizable Mixture 175 g of methacrylonitrile (MAN), which is a polymerization monomer, 25 g of methacrylic acid (MAA), 60 g of isooctane as a foaming agent, and 2 g of 2,2'-azobisisobutyronitril (V-60) as a polymerization initiator were mixed to prepare a polymerizable mixture. In Example 13, the molar ratio of methacrylonitrile to methacrylic acid was 9:1.

(C) Suspension polymerization was performed in the same manner with Example 1 to thereby obtain a thermally foamable microsphere with an average particle diameter of 27 μm.

The evaluation of foaming ability (D) and measurement of color tone (E) were performed using, as a sample, the obtained thermally foamable microsphere as it was in the same manner with Example 1. As a result, the expanding starting temperature was 211° C., the maximum expansion temperature was 218° C., and the difference therebetween was 7° C. The expansion ratio was 6.5 times at 220° C. and the b* value was 41.0.

Example 14

Suspension polymerization was performed in the same manner with Example 13 except using 129 g of methacrylonitrile and 71 g of methacrylic acid to thereby obtain a thermally foamable microsphere with an average particle diameter of 27 μm. In Example 14, the molar ratio of methacrylonitrile to methacrylic acid was 2.3:1.

The TMA measurement was performed using, as a sample, the thermally foamable microsphere obtained as a result of the above manner as it was. As a result, the expanding starting temperature was 204° C., the maximum expansion temperature was 259° C., and the difference therebetween was 55° C. The expansion ratio was 17.0 times at 230° C. and the b* value was 31.0.

Example 15

Suspension polymerization was performed in the same manner with Example 13 except using 108 g of methacrylonitrile and 92 g of methacrylic acid to thereby obtain a thermally foamable microsphere with an average particle diameter of 26 μm. In Example 15, the molar ratio of methacrylonitrile to methacrylic acid was 1.5:1.

The TMA measurement was performed using, as a sample, the thermally foamable microsphere obtained as a result of the above manner as it was. As a result, the expanding starting temperature was 189° C., the maximum expansion temperature was 266° C., and the difference therebetween was 77° C. The expansion ratio was 17.6 times at 230° C. and the b* value was 27.0.

Moreover, the heat foamed particle density was 0.0046 at 230° C., 0.0045 at 240° C., and 0.0068 at 250° C. (see Table 2).

Example 16

Suspension polymerization was performed in the same manner with Example 13 except using 88 g of methacrylonitrile and 112 g of methacrylic acid to thereby obtain a thermally foamable microsphere with an average particle diameter of 31 μm. In Example 16, the molar ratio of methacrylonitrile to methacrylic acid was 1:1.

The TMA measurement was performed using, as a sample, the thermally foamable microsphere obtained as a result of the above manner as it was. As a result, the expanding starting temperature was 199° C., the maximum expansion temperature was 263° C., and the difference therebetween was 64° C. The above-mentioned thermally foamable microsphere was heated at 180° C. for 10 minutes, and then the TMA measurement was performed. Changes in both the expanding starting temperature and the maximum expansion temperature were hardly observed. The expansion ratio was 14.5 times at 230° C. and the b* value was 24.0.

FIG. 1 shows changes (foaming behavior) in the foaming degree between at the expanding starting temperature and at the maximum expansion temperature at the time of TMA measurement. About 0.25 mg of a sample was put in a container, and the temperature was increased at a temperature increase rate of 5° C./minute. Then, the variation in the height was successively measured. The height at each temperature was indicated relative to the height at the maximum expansion temperature (Tmax), which was defined as 1.

As shown in FIG. 1, it is revealed that the thermally foamable microsphere obtained in Example 16 hardly shows changes in the expanding starting temperature and the maximum expansion temperature when not heated and when heated at 180° C. for 10 minutes. In addition, there are no changes in the foaming behavior between at the expanding starting temperature and at the maximum expansion temperature, and a stable foaming ability is maintained.

Example 17

Suspension polymerization was performed in the same manner with Example 16 except using 60 g of lauryl peroxide (indicated as LPO in Tables) isopentane in place of 2 g of 2,2'-azobisisobutyronitril as the polymerization initiator to thereby obtain a thermally foamable microsphere with an average particle diameter of 30 μm.

The TMA measurement was performed using, as a sample, the thermally foamable microsphere obtained as a result of the above manner as it was. As a result, the expanding starting temperature was 200° C., the maximum expansion temperature was 250° C., and the difference therebetween was 50° C. The expansion ratio was 7.1 times at 230° C. and the b* value was 23.0.

Example 18

Suspension polymerization was performed in the same manner with Example 17 except using 68 g of methacrylonitrile and 132 g of methacrylic acid to thereby obtain a thermally foamable microsphere with an average particle diameter of 28 μm. In Example 18, the molar ratio of methacrylonitrile to methacrylic acid was 0.7:1.

The TMA measurement was performed using, as a sample, the thermally foamable microsphere obtained as a result of the above manner as it was. As a result, the expanding starting temperature was 207° C., the maximum expansion temperature was 232° C., and the difference therebetween was 25° C. The expansion ratio was 4.1 times at 230° C. and the b* value was 23.0.

Example 19

Suspension polymerization was performed in the same manner with Example 13 except adding, in addition to 175 g of methacrylonitrile and 25 g of methacrylic acid, 0.4 g of trimethylolpropanetrimethacrylate (indicated as TMPTMA in Tables) to thereby obtain a thermally foamable microsphere with an average particle diameter of 30 μm. The blending proportion of trimethylolpropanetrimethacrylate in the polymerizable monomer mixture of Example 19 was 0.04 mol %.

The TMA measurement was prepared using, as a sample, the thermally foamable microsphere obtained as a result of the above manner as it was. As a result, the expanding starting temperature was 213° C., the maximum expansion temperature was 218° C., and the difference therebetween was 5° C. The expansion ratio was 6.7 times at 230° C.

Example 20

Suspension polymerization was performed in the same manner with Example 15 except adding, in addition to 108 g of methacrylonitrile and 92 g of methacrylic acid, 0.2 g of trimethylolpropanetrimethacrylate to thereby obtain a thermally foamable microsphere with an average particle diameter of 26 μm. The blending proportion of trimethylolpropanetrimethacrylate in the polymerizable monomer mixture of Example 20 was 0.02 mol %.

The TMA measurement was performed using, as a sample, the thermally foamable microsphere obtained as a result of the above manner as it was. As a result, the expanding starting temperature was 188° C., the maximum expansion temperature was 250° C., and the difference therebetween was 62° C. The expansion ratio was 10.6 times at 230° C.

Example 21

Suspension polymerization was performed in the same manner with Example 15 except adding, in addition to 108 g of methacrylonitrile and 92 g of methacrylic acid, 0.6 g of trimethylolpropanetrimethacrylate to thereby obtain a thermally foamable microsphere with an average particle diameter of 29 μm. The blending proportion of trimethylolpropanetrimethacrylate in the polymerizable monomer mixture of Example 21 is 0.07 mol %.

The TMA measurement was performed using, as a sample, the thermally foamable microsphere obtained as a result of the above manner as it was. As a result, the expanding starting temperature was 187° C., the maximum expansion temperature was 223° C., and the difference therebetween was 36° C. The expansion ratio was 11.3 times at 230° C.

Example 22

Suspension polymerization was performed in the same manner with Example 15 except adding, in addition to 108 g of methacrylonitrile and 92 g of methacrylic acid, 1.0 g of trimethylolpropanetrimethacrylate to thereby obtain a thermally foamable microsphere with an average particle diameter of 31 μm. The blending proportion of trimethylolpropanetrimethacrylate in the polymerizable monomer mixture of Example 22 was 0.11 mol %.

The TMA measurement was performed using, as a sample, the thermally foamable microsphere obtained as a result of the above manner as it was. As a result, the expanding starting temperature was 185° C., the maximum expansion temperature was 220° C., and the difference therebetween was 35° C. The expansion ratio was 8.0 times at 230° C.

Example 23

Suspension polymerization was performed in the same manner with Example 15 except adding 98 g of methacrylonitrile, 92 g of methacrylic acid, and 10 g of methyl acrylate (indicated as MA in Tables) to thereby obtain a thermally foamable microsphere with an average particle diameter of 27 μm. The molar ratio of methacrylonitrile to methacrylic acid was 1.4:1 and the blending proportion of methyl acrylate was 5% by weight in Example 23.

The TMA measurement was performed using, as a sample, the thermally foamable microsphere obtained as a result of the above manner as it was. As a result, the expanding starting temperature was 189° C., the maximum expansion temperature was 259° C., and the difference therebetween was 70° C. The expansion ratio was 13.4 times at 230° C.

Example 24

Suspension polymerization was performed in the same manner with Example 15 except adding 98 g of methacrylonitrile, 92 g of methacrylic acid, and 10 g of methyl methacrylate (indicated as MMA in Tables) to thereby obtain a thermally foamable microsphere with an average particle diameter of 25 μm. The molar ratio of methacrylonitrile to methacrylic acid was 1.4:1 and the blending proportion of methyl acrylate was 5% by weight in Example 24.

The TMA measurement was performed using, as a sample, the thermally foamable microsphere obtained as a result of the above manner as it was. As a result, the expanding starting temperature was 185° C., the maximum expansion temperature was 242° C., and the difference therebetween was 57° C. The expansion ratio was 14.2 times at 230° C.

Example 25

Suspension polymerization was performed in the same manner with Example 15 except adding 88 g of methacrylonitrile, 92 g of methacrylic acid, and 20 g of methyl methacrylate to thereby obtain a thermally foamable microsphere with an average particle diameter of 27 μm. The molar ratio of methacrylonitrile to methacrylic acid was 1.2:1 and the blending proportion of methyl acrylate was 10% by weight in Example 25.

The TMA measurement was performed using, as a sample, the thermally foamable microsphere obtained as a result of the above manner as it was. As a result, the expanding starting temperature was 186° C., the maximum expansion temperature was 235° C., and the difference therebetween was 49° C. The expansion ratio was 13.3 times at 230° C.

Example 26

Suspension polymerization was performed in the same manner with Example 15 except adding 104 g of methacrylonitrile, 92 g of methacrylic acid, and 4 g of dimethylamino ethyl methacrylate (indicated as DMAEMA in Tables) to thereby obtain a thermally foamable microsphere with an average particle diameter of 24 μm. The molar ratio of methacrylonitrile to methacrylic acid was 1.5:1 and the blending proportion of dimethylamino ethyl methacrylate was 2% by weight in Example 26.

The TMA measurement was performed using, as a sample, the thermally foamable microsphere obtained as a result of the above manner as it was. As a result, the expanding starting temperature was 190° C., the maximum expansion temperature was 251° C., and the difference therebetween was 61° C. The expansion ratio was 11.4 times at 230° C.

TABLE 1

| | Blending Composition of Polymerizable Mixture | | Foaming Agent | Average Particle Diameter (μm) | Expanding starting temperature ° C. | Maximum expansion temperature ° C. | Expansion ratio (times) | b* Value (Yellowness) after Heated at 240° C. for 2 minutes | Initiator |
|---|---|---|---|---|---|---|---|---|---|
| Ex. 1 | MAN 88 g MAA 112 g | Molar Ratio 1:1 | Isooctane 60 g | 40 | Non Heat-Treated 195 After Heated | Non Heat-Treated 217 After Heated | 8.4 | *1 24.5 | V-60 2 g |

TABLE 1-continued

| | Blending Composition of Polymerizable Mixture | | Foaming Agent | Average Particle Diameter (μm) | Expanding starting temperature °C | Maximum expansion temperature °C | Expansion ratio (times) | | b* Value (Yellowness) after Heated at 240° C. for 2 minutes | Initiator |
|---|---|---|---|---|---|---|---|---|---|---|
| | | | | | at 170° C. for 2 minutes 195 | at 170° C. for 2 minutes 217 | | | | |
| Ex. 2 | MAN 110 g MAA 90 g | Molar Ratio 1.6:1 | | 39 | 186 | 214 | 8.4 | *1 | 26.8 | |
| Ex. 3 | MAN 132 g MAA 68 g | Molar Ratio 2.5:1 | | 41 | 171 | 255 | 10.5 | *2 | 27.1 | |
| Ex. 4 | MAN 154 g MAA 46 g | Molar Ratio 4.3:1 | | 50 | 180 | 260 | 8.6 | *2 | 35.4 | |
| Ex. 5 | MAN 88 g MAA 112 g | Molar Ratio 1:1 | Isopentane 60 g | 40 | 185 | 240 | 4.5 | *1 | 25 | |
| Ex. 6 | MAN 110 g MAA 90 g | Molar Ratio 1.6:1 | | 49 | 170 | 240 | 9.1 | *2 | 27 | |
| Ex. 7 | MAN 132 g MAA 68 g | Molar Ratio 2.5:1 | | 47 | 155 | 220 | 19.2 | *3 | 27.5 | |
| Ex. 8 | MAN 154 g MAA 46 g | Molar Ratio 4.3:1 | | 50 | 130 | 210 | 17.3 | *4 | 36 | |
| Ex. 9 | MAN 132 g MAA 68 g | Molar Ratio 2.5:1 | Isododecane 60 g | 31 | 251 | 279 | 1.5 | *1 | 28 | |
| Ex. 10 | MAN 130 g MAA 66 g MA 4 g | Molar Ratio 2.5:1 | Isooctane 60 g | 34 | 171 | 245 | 10.0 | *2 | 27 | |
| Ex. 11 | MAN 130 g MAA 66 g MA 4 g | Molar Ratio 2.5:1 | Isopentane 60 g | 50 | 150 | 220 | 19.1 | *3 | 26.9 | |
| Ex. 13 | MAN 175 g MAA 25 g | Molar Ratio 9:1 | Isooctane 60 g | 27 | 211 | 218 | 6.5 | *2 | 41 | |
| Ex. 14 | MAN 129 g MAA 71 g | Molar Ratio 2.3:1 | | 27 | 204 | 259 | 17.0 | *1 | 31 | |
| Ex. 15 | MAN 108 g MAA 92 g | Molar Ratio 1.5:1 | | 26 | 189 | 266 | 17.6 | *1 | 27 | |
| Ex. 16 | MAN 88 g MAA 112 g | Molar Ratio 1:1 | | 31 | Non Heat-Treated 199 After Heated at 180° C. for 10 minutes 197 | Non Heat-Treated 263 After Heated at 180° C. for 10 minutes 266 | 14.5 | *1 | 24 | |
| Ex. 17 | MAN 88 g MAA 112 g | Molar Ratio 1:1 | | 30 | 200 | 250 | 7.1 | *1 | 23 | LPO 3 g |
| Ex. 18 | MAN 68 g MAA 132 g | Molar Ratio 0.7:1 | | 28 | 207 | 232 | 4.1 | *1 | 23 | |
| Ex. 19 | MAN 175 g MAA 25 g TMPTMA 0.4 g | Molar Ratio 9:1 0.04 mol % | | 30 | 213 | 218 | 6.7 | *1 | | V-60 2 g |
| Ex. 20 | MAN 108 g MAA 92 g TMPTMA 0.2 g | Molar Ratio 1.5:1 9:1 0.02 mol % | | 26 | 188 | 250 | 10.6 | *1 | | |
| Ex. 21 | MAN 108 g MAA 92 g TMPTMA 0.6 g | Molar Ratio 1.5:1 0.07 mol % | | 29 | 187 | 223 | 11.3 | *1 | | |
| Ex. 22 | MAN 108 g MAA 92 g TMPTMA 1.0 g | Molar Ratio 1.5:1 0.11 mol % | | 31 | 185 | 220 | 8.0 | *1 | | |
| Ex. 23 | MAN 98 g MAA 92 g MA 10 g | Molar Ratio 1.4:1 5 parts | | 27 | 189 | 259 | 13.4 | *1 | | |
| Ex. 24 | MAN 98 g MAA 92 g MMA 10 g | Molar Ratio 1.4:1 5 parts | | 25 | 185 | 242 | 14.2 | *1 | | |
| Ex. 25 | MAN 88 g MAA 92 g MMA 20 g | Molar Ratio 1.2:1 10 parts | | 27 | 186 | 235 | 13.3 | *1 | | |
| Ex. 26 | MAN 104 g MMA 92 g DMAEMA 4 g | Molar Ratio 1.5:1 2 parts | | 24 | 190 | 251 | 11.4 | *1 | | |

*1: 230° C.,
*2: 220° C.,
*3: 210° C.,
*4: 200° C.,
*5: 190° C.

Example 27

Suspension polymerization was performed in the same manner with Example 15 except using 60 g of isododecane in place of 60 g of isooctane as the foaming agent to thereby obtain a thermally foamable microsphere with an average particle diameter of 26 μm (See Table 2).

The TMA measurement was performed using, as a sample, the thermally foamable microsphere obtained as a result of the above manner as it was. As a result, the expanding starting temperature was 232° C., the maximum expansion temperature was 283° C., and the difference therebetween was 51° C. The heat foamed particle density was 0.0612 at 240° C. and 0.0236 at 250° C. (see Table 2).

Example 28

Suspension polymerization was performed in the same manner with Example 15 except using 60 g of isopentane in place of 60 g of isooctane as the foaming agent to thereby obtain a thermally foamable microsphere with an average particle diameter of 31 μm.

The TMA measurement was performed using, as a sample, the thermally foamable microsphere obtained as a result of the above manner as it was. As a result, the expanding starting temperature was 168° C., the maximum expansion temperature was 234° C., and the difference therebetween was 66° C. The expansion ratio was 14.4 times at 230° C. The heat foamed particle density was 0.0116 at 220° C., 0.0072 at 230° C., and 0.0061 at 240° C.

Example 29

Suspension polymerization was performed in the same manner with Example 15 except using 40 g of isobutane in place of 60 g of isooctane as the foaming agent to thereby obtain a thermally foamable microsphere with an average particle diameter of 27 μm.

The TMA measurement was performed using, as a sample, the thermally foamable microsphere obtained as a result of the above manner as it was. As a result, the expanding starting temperature was 159° C., the maximum expansion temperature was 228° C., and the difference therebetween was 69° C. The expansion ratio was 9.8 times at 230° C. The heat foamed particle density was 0.0108 at 220° C., 0.0104 at 230° C., and 0.0146 at 240° C.

Example 30

Suspension polymerization was performed in the same manner with Example 15 except using 20 g of isobutane and 40 g of isododecane in place of 60 g of isooctane as the foaming agent to thereby obtain a thermally foamable microsphere with an average particle diameter of 26 μm.

The TMA measurement was performed using, as a sample, the thermally foamable microsphere obtained as a result of the above manner as it was. As a result, the expanding starting temperature was 175° C., the maximum expansion temperature was 240° C., and the difference therebetween was 65° C. The expansion ratio was 10.3 times at 230° C. The heat foamed particle density was 0.0097 at 230° C., 0.0108 at 240° C., and 0.0120 at 250° C.

Example 31

Suspension polymerization was performed in the same manner with Example 15 except using 10 g of isobutane and 50 g of isododecane in place of 60 g of isooctane as the foaming agent to thereby obtain a thermally foamable microsphere with an average particle diameter of 26 μm.

The TMA measurement was performed using, as a sample, the thermally foamable microsphere obtained as a result of the above manner as it was. As a result, the expanding starting temperature was 198° C., the maximum expansion temperature was 260° C., and the difference therebetween was 62° C. The expansion ratio was 8.7 times at 230° C. The heat foamed particle density was 0.0123 at 230° C., 0.0113 at 240° C., and 0.0119 at 250° C.

Example 32

Suspension polymerization was performed in the same manner with Example 15 except using 5 g of isobutane and 55 g of isododecane in place of 60 g of isooctane as the foaming agent to thereby obtain a thermally foamable microsphere with an average particle diameter of 25 μm.

The TMA measurement was performed using, as a sample, the thermally foamable microsphere obtained as a result of the above manner as it was. As a result, the expanding starting temperature was 200° C., the maximum expansion temperature was 277° C., and the difference therebetween was 77° C. The expansion ratio was 5.8 times at 230° C. The heat foamed particle density was 0.0221 at 230° C., 0.0205 at 240° C., and 0.0140 at 250° C.

Example 33

Suspension polymerization was performed in the same manner with Example 15 except using 20 g of isopentane and 40 g of isododecane in place of 60 g of isooctane as the foaming agent to thereby obtain a thermally foamable microsphere with an average particle diameter of 25 μm.

The TMA measurement was performed using, as a sample, the thermally foamable microsphere obtained as a result of the above manner as it was. As a result, the expanding starting temperature was 193° C., the maximum expansion temperature was 237° C., and the difference therebetween was 44° C. The expansion ratio was 11.8 times at 230° C. The heat foamed particle density was 0.0080 at 230° C. and 0.0088 at 240° C.

Example 34

Suspension polymerization was performed in the same manner with Example 15 except using 10 g of isopentane and 50 g of isododecane in place of 60 g of isooctane as the foaming agent to thereby obtain a thermally foamable microsphere with an average particle diameter of 24 μm.

The TMA measurement was performed using, as a sample, the thermally foamable microsphere obtained as a result of the above manner as it was. As a result, the expanding starting temperature was 195° C., the maximum expansion temperature was 264° C., and the difference therebetween was 69° C. The expansion ratio was 8.5 times at 230° C. The heat foamed particle density was 0.0127 at 230° C., 0.0117 at 240° C., and 0.0110 at 250° C.

Example 35

Suspension polymerization was performed in the same manner with Example 15 except using 5 g of isopentane and 55 g of isododecane in place of 60 g of isooctane as the foaming agent to thereby obtain a thermally foamable microsphere with an average particle diameter of 22 μm.

The TMA measurement was performed using, as a sample, the thermally foamable microsphere obtained as a result of the above manner as it was. As a result, the expanding starting temperature was 208° C., the maximum expansion temperature was 272° C., and the difference therebetween was 64° C. The heat foamed particle density was 0.0155 at 240° C. and 0.0154 at 250° C.

Example 36

Suspension polymerization was performed in the same manner with Example 15 except using 40 g of isooctane in place of 60 g of isooctane as the foaming agent to thereby obtain a thermally foamable microsphere with an average particle diameter of 25 μm.

The TMA measurement was performed using, as a sample, the thermally foamable microsphere obtained as a result of the above manner as it was. As a result, the expanding starting temperature was 188° C., the maximum expansion temperature was 256° C., and the difference therebetween was 68° C. The expansion ratio was 8.6 times at 230° C. The heat foamed particle density was 0.0125 at 230° C., 0.0116 at 240° C., and 0.0124 at 250° C.

Example 37

Suspension polymerization was performed in the same manner with Example 15 except using 80 g of isooctane in place of 60 g of isooctane as the foaming agent to thereby obtain a thermally foamable microsphere with an average particle diameter of 27 μm.

The TMA measurement was performed using, as a sample, the thermally foamable microsphere obtained as a result of the above manner as it was. As a result, the expanding starting temperature was 187° C., the maximum expansion temperature was 260° C., and the difference therebetween was 73° C. The expansion ratio was 12.4 times at 230° C. The heat foamed particle density was 0.0075 at 230° C., 0.0069 at 240° C., and 0.0068 at 250° C.

Example 38

Suspension polymerization was performed in the same manner with Example 15 except using 100 g of isooctane in place of 60 g of isooctane as the foaming agent to thereby obtain a thermally foamable microsphere with an average particle diameter of 23 μm.

The TMA measurement was performed using, as a sample, the thermally foamable microsphere obtained as a result of the above manner as it was. As a result, the expanding starting temperature was 187° C., the maximum expansion temperature was 260° C., and the difference therebetween was 73° C. The expansion ratio was 12.8 times at 230° C. The heat foamed particle density was 0.0072 at 230° C., 0.0061 at 240° C., and 0.0068 at 250° C.

Example 39

Suspension polymerization was performed in the same manner with Example 15 except adding 110 g of methacrylonitrile, 86 g of methacrylic acid, and 4 g of methyl acrylate, and further adding 22 g of isopentane and 22 g of isooctane in place of 60 g of isooctane as the foaming agent to thereby obtain a thermally foamable microsphere with an average particle diameter of 21 μm.

The TMA measurement was performed using, as a sample, the thermally foamable microsphere obtained as a result of the above manner as it was. As a result, the expanding starting temperature was 176° C., the maximum expansion temperature was 231° C., and the difference therebetween was 55° C. The expansion ratio was 11.0 times at 230° C. The heat foamed particle density was 0.0106 at 210° C., 0.0089 at 220° C., and 0.0094 at 230° C.

Example 40

Suspension polymerization was performed in the same manner with Example 15 except adding 110 g of methacrylonitrile, 86 g of methacrylic acid, and 4 g of methyl acrylate, and further adding 30 g of isopentane and 30 g of isooctane in place of 60 g of isooctane as the foaming agent to thereby obtain a thermally foamable microsphere with an average particle diameter of 24 μm.

The TMA measurement was performed using, as a sample, the thermally foamable microsphere obtained as a result of the above manner as it was. As a result, the expanding starting temperature was 175° C., the maximum expansion temperature was 235° C., and the difference therebetween was 60° C. The expansion ratio was 14.2 times at 220° C. The heat foamed particle density was 0.0093 at 210° C., 0.0062 at 220° C., and 0.0068 at 230° C.

Example 41

Suspension polymerization was performed in the same manner with Example 15 except adding 110 g of methacrylonitrile, 86 g of methacrylic acid, and 4 g of methyl acrylate, and further adding 40 g of isopentane and 40 g of isooctane in place of 60 g of isooctane as the foaming agent to thereby obtain a thermally foamable microsphere with an average particle diameter of 26 μm.

The TMA measurement was performed using, as a sample, the thermally foamable microsphere obtained as a result of the above manner as it was. As a result, the expanding starting temperature was 172° C., the maximum expansion temperature was 241° C., and the difference therebetween was 69° C. The expansion ratio was 16.0 times at 210° C. The heat foamed particle density was 0.0083 at 210° C., 0.0054 at 220° C., and 0.0052 at 230° C.

Example 42

Suspension polymerization was performed in the same manner with Example 15 except adding 110 g of methacrylonitrile, 86 g of methacrylic acid, and 4 g of methyl acrylate, and further adding 50 g of isopentane and 50 g of isooctane in place of 60 g of isooctane as the foaming agent to thereby obtain a thermally foamable microsphere with an average particle diameter of 30 μm.

The TMA measurement was performed using, as a sample, the thermally foamable microsphere obtained as a result of the above manner as it was. As a result, the expanding starting temperature was 168° C., the maximum expansion temperature was 247° C., and the difference therebetween was 79° C. The expansion ratio was 18.2 times at 210° C. The heat foamed particle density was 0.0083 at 210° C., 0.0044 at 220° C., and 0.0047 at 230° C.

TABLE 2

| | Blending Composition of Polymerizable Mixture | | Foaming Agent | Average Particle Diameter (μm) | Expanding starting temperature °C. | Maximum expansion temperature °C. | Expansion ratio (times) | Foamed Particle Density | Initiator |
|---|---|---|---|---|---|---|---|---|---|
| Ex. 15 | MAN 108 g MAA 92 g | Molar Ratio 1.5:1 | Isooctane 60 g | 26 | 189 | 266 | 17.6 | *1 230° C.: 0.0046<br>240° C.: 0.0045<br>250° C.: 0.0068 | V-60 2 g |
| Ex. 27 | | | Isododecane 60 g | 23 | 232 | 283 | Non Foamed | *1 230° C.: Non Foamed<br>240° C.: 0.0612<br>250° C.: 0.0236 | |
| Ex. 28 | | | Isopentane 60 g | 31 | 168 | 234 | 14.4 | *1 220° C.: 0.0116<br>230° C.: 0.0072<br>240° C.: 0.0061 | |
| Ex. 29 | | | Isobutane 40 g | 27 | 159 | 228 | 9.8 | *1 220° C.: 0.0108<br>230° C.: 0.0104<br>240° C.: 0.0146 | |
| Ex. 30 | | | Isobutane 20 g<br>Isododecane 40 g | 26 | 175 | 240 | 10.3 | *1 230° C.: 0.0097<br>240° C.: 0.0108<br>250° C.: 0.0120 | |
| Ex. 31 | | | Isobutane 10 g<br>Isododecane 50 g | 26 | 198 | 260 | 8.7 | *1 230° C.: 0.0123<br>240° C.: 0.0113<br>250° C.: 0.0119 | |
| Ex. 32 | | | Isobutane 5 g<br>Isododecane 55 g | 25 | 200 | 277 | 5.8 | *1 230° C.: 0.0221<br>240° C.: 0.0205<br>250° C.: 0.0140 | |
| Ex. 33 | | | Isopentane 20 g<br>Isododecane 40 g | 25 | 193 | 237 | 11.8 | *1 230° C.: 0.0080<br>240° C.: 0.0088<br>250° C.: — | |
| Ex. 34 | | | Isopentane 10 g<br>Isododecane 50 g | 24 | 195 | 264 | 8.5 | *1 230° C.: 0.0127<br>240° C.: 0.0117<br>250° C.: 0.0110 | |
| Ex. 35 | | | Isopentane 5 g<br>Isododecane 55 g | 22 | 208 | 272 | — | *1 230° C.: —<br>240° C.: 0.0155<br>250° C.: 0.0154 | |
| Ex. 36 | | | Isooctane 40 g | 25 | 188 | 256 | 8.6 | *1 230° C.: 0.0125<br>240° C.: 0.0116<br>250° C.: 0.0124 | |
| Ex. 37 | | | Isooctane 80 g | 27 | 187 | 260 | 12.4 | *1 230° C.: 0.0075<br>240° C.: 0.0069<br>250° C.: 0.0068 | |
| Ex. 38 | | | Isooctane 100 g | 23 | 187 | 260 | 12.8 | *1 230° C.: 0.0072<br>240° C.: 0.0061<br>250° C.: 0.0068 | |
| Ex. 39 | MAN 110 g MAA 86 g MA 4 g | Molar Ratio 1.6:1 | Isopentane 22 g<br>Isooctane 22 g | 21 | 176 | 231 | 11.0 | *1 210° C.: 0.0106<br>220° C.: 0.0089<br>230° C.: 0.0094 | |
| Ex. 40 | | | Isopentane 30 g<br>Isooctane 30 g | 24 | 175 | 235 | 14.2 | *2 210° C.: 0.0093<br>220° C.: 0.0062<br>230° C.: 0.0068 | |
| Ex. 41 | | | Isopentane 40 g<br>Isooctane 40 g | 26 | 172 | 241 | 16.0 | *3 210° C.: 0.0083<br>220° C.: 0.0054<br>230° C.: 0.0052 | |
| Ex. 42 | | | Isopentane 50 g<br>Isooctane 50 g | 30 | 168 | 247 | 18.2 | *3 210° C.: 0.0083<br>220° C.: 0.0044<br>230° C.: 0.0047 | |

*1: 230° C.,
*2: 220° C.,
*3: 210° C.,
*4: 200° C.,
*5: 190° C.

Example 43

Suspension polymerization was performed in the same manner with Example 15 except using 50 g of 20% by weight colloidal silica in place of 65 g of 20% by weight colloidal silica and adjusting the number of rotation of an emulsifier to 8,500 r/m in preparation of an aqueous dispersion medium to thereby obtain a thermally foamable microsphere with an average particle diameter of 39 μm (see Table 3).

The TMA measurement was performed using, as a sample, the thermally foamable microsphere obtained as a result of the above manner as it was. As a result, the expanding starting temperature was 185° C., the maximum expansion temperature was 266° C., and the difference therebetween was 81° C. The expansion ratio was 11.3 times at 230° C. The heat foamed particle density was 0.0210 at 210° C., 0.0113 at 220° C., and 0.0085 at 230° C. (see Table 3).

Example 44

Suspension polymerization was performed in the same manner with Example 15 except using 40 g of 20% by weight colloidal silica in place of 65 g of 20% by weight colloidal silica and adjusting the number of rotation of an emulsifier to 7,500 r/m in preparation of an aqueous dispersion medium to thereby obtain a thermally foamable microsphere with an average particle diameter of 58 μm.

The TMA measurement was performed using, as a sample, the thermally foamable microsphere obtained as a result of the above manner as it was. As a result, the expanding starting temperature was 181° C., the maximum expansion temperature was 232° C., and the difference therebetween was 51° C. The expansion ratio was 11.3 times at 230° C. The heat foamed particle density was 0.0150 at 210° C., 0.0100 at 220° C., and 0.0086 at 230° C.

Example 45

Suspension polymerization was performed in the same manner with Example 15 except using 20 g of 20% by weight colloidal silica in place of 65 g of 20% by weight colloidal silica and adjusting the number of rotation of an emulsifier to 5,500 r/m in preparation of an aqueous dispersion medium to thereby obtain a thermally foamable microsphere with an average particle diameter of 118 μm.

The TMA measurement was performed using, as a sample, the thermally foamable microsphere obtained as a result of the above manner as it was. As a result, the expanding starting temperature was 177° C., the maximum expansion temperature was 201° C., and the difference therebetween was 24° C. The expansion ratio was 2.8 times at 210° C. The heat foamed particle density was 0.0598 at 210° C., 0.0641 at 220° C., and 0.0748 at 230° C.

Examples of Patent Document 2, suspension polymerization was performed in the same manner with Example 1 except using 45.4 g of acrylonitrile, 45.4 g of methacrylonitrile, and 109.2 g of methacrylic acid in place of 88 g of methacrylonitrile and 112 g of methacrylic acid, and further adding 2.72 g of ethylene glycol dimethacrylate (indicated as EGDMA in Table) as a cross linkable monomer. As a result, the polymer agglomerated in the middle of polymerization, and thus a normal thermally foamable microsphere was not successfully obtained.

Comparative Example 3

In order to confirm influences caused by the use of a larger amount of acrylonitrile, suspension polymerization was performed in the same manner with Example 1 except using 66.6 g of acrylonitrile, 66.6 g of methacrylonitrile, and 66.6 g of methacrylic acid in place of 88 g of methacrylonitrile and 112 g of methacrylic acid. As a result, the polymer agglomerated in the middle of polymerization, and thus a normal thermally foamable microsphere was not successfully obtained.

Comparative Example 4

In order to confirm the particle formability of a polymerizable mixture whose composition is similar to that of Examples of Patent Document 2, suspension polymerization was performed in the same manner with Example 1 except

TABLE 3

| | Blending Composition of Polymerizable Mixture | | Colloidal Silica | Number of Rotation of Emulsifier | Average Particle Diameter (μm) | Expanding starting temperature ° C. | Maximum expansion temperature ° C. | Expansion ratio (times) | Foamed Particle Density | Initiator |
|---|---|---|---|---|---|---|---|---|---|---|
| Ex. 15 | MAN 108 g MAA 92 g Isooctane 60 g | Molar Ratio 1.5:1 | 65 g | 9500 r/m | 26 | 189 | 266 | 17.6 | *1 210° C.: 0.0201 220° C.: 0.0074 230° C.: 0.0046 | V-60 g |
| Ex. 43 | | | 50 g | 8500 r/m | 39 | 185 | 266 | 11.3 | *1 210° C.: 0.0210 220° C.: 0.0113 230° C.: 0.0085 | |
| Ex. 44 | | | 40 g | 7500 r/m | 58 | 181 | 232 | 11.3 | *1 210° C.: 0.0150 220° C.: 0.0100 230° C.: 0.0086 | |
| Ex. 45 | | | 20 g | 5500 r/m | 118 | 177 | 201 | 2.8 | *3 210° C.: 0.0598 220° C.: 0.0641 230° C.: 0.0748 | |

*1: 230° C.,
*2: 220° C.,
*3: 210° C.,
*4: 200° C.,
*5: 190° C.

Comparative Example 1

Comparative Example 1 is a test for confirming influences caused by the use of a large amount of acrylonitrile. Suspension polymerization was performed in the same manner with Example 1 except using 45.4 g of acrylonitrile, 45.4 g of methacrylonitrile, and 109.2 g of methacrylic acid in place of 88 g of methacrylonitrile and 112 g of methacrylic acid. As a result, the polymer agglomerated in the middle of polymerization, and thus a normal thermally foamable microsphere was not successfully obtained (see Table 4).

Comparative Example 2

In order to confirm the particle formability of a polymerizable mixture whose composition is similar to that of using 66.6 g of acrylonitrile, 66.6 g of methacrylonitrile, and 66.6 g of methacrylic acid in place of 88 g of methacrylonitrile and 112 g of methacrylic acid, and further adding 2.86 g of ethylene glycol dimethacrylate as a cross linkable monomer.

As a result, the polymer agglomerated in the middle of polymerization, and thus a normal thermally foamable microsphere was not successfully obtained.

Comparative Example 5

Suspension polymerization was performed in the same manner with Example 1 except using only 200 g of methacrylic acid in place of 88 g of methacrylonitrile and 112 g of methacrylic acid. As a result, the polymer agglomerated in the middle of polymerization.

Comparative Example 6

Suspension polymerization was performed in the same manner with Example 1 except using only 200 g of methacrylonitrile in place of 88 g of methacrylonitrile and 112 g of methacrylic acid to thereby obtain a thermally foamable microsphere with an average particle diameter of 47 μm. The resulted microsphere did not foam. The b* value was 200.

Comparative Example 7

In order to confirm influences of a cross-linkable monomer, suspension polymerization was performed in the same manner with Example 3 except adding 2.72 g of ethylene glycol dimethacrylate as a cross-linkable monomer to thereby obtain a thermally foamable microsphere with an average particle diameter of 50 μm. The addition amount of the cross-linkable monomer was 0.5 mol % relative to the polymerizable monomer.

The TMA measurement was performed using, as a sample, the thermally foamable microsphere obtained as a result of the above manner as it was. As a result, the expanding starting temperature was 169° C., the maximum expansion temperature was 173° C. The expansion ratio was sharply lowered to be 1.1 times at 220° C.

Comparative Example 8

Comparative Example 8 is a test for confirming influences on the foaming behavior. Suspension polymerization was performed in the same manner with Example 1 except using 67 g of acrylonitrile, 31 g of methacrylonitrile, 2 g of methacrylic acid, and 1.5 g of diethyleneglycol dimethacrylate (indicated as DEGDMA in Table) in place of 88 g of methacrylonitrile and 112 g of methacrylic acid, and using 1 g of isopentane, 13 g of isooctane, and 16 g of isododecane in place of 60 g of isooctane as the foaming agent to thereby obtain a thermally foamable microsphere with an average particle diameter of 49 μm. The addition amount of the cross-linkable monomer was 0.35 mol % relative to the polymerizable monomer.

The TMA measurement was performed using, as a sample, the thermally foamable microsphere obtained as a result of the above manner as it was. As a result, the expanding starting temperature was 204° C., the maximum expansion temperature was 209° C., and the difference therebetween was 5° C. The above-mentioned thermally foamable microsphere was heated at 170° C. for 2 minutes, and then the TMA measurement was performed. The expanding starting temperature was 135° C. and the maximum expansion temperature was 194° C. The expansion ratio after heated at 170° C. for 2 minutes was 8.3 times at 190° C.

FIG. 2 shows changes (foaming behavior) in the foaming degree between at the expanding starting temperature and at the maximum expansion temperature at the time of TMA measurement. It is revealed that the thermally foamable microsphere obtained in Comparative Example 8 is reduced in both the expanding starting temperature and the maximum expansion temperature when not heated and when heated at 170° C. for 2 minutes, and moreover the foaming behavior between at the expanding starting temperature and at the maximum expansion temperature sharply changes (also see FIG. 1).

TABLE 4

| | Blending Composition of Polymerizable Mixture | | Foaming Agent | Average Particle Diameter (μm) | Expanding starting temperature ° C. | Maximum expansion temperature ° C. | Expansion ratio (times) | b* Value (Yellowness) after Heated at 240 for 2 minutes |
|---|---|---|---|---|---|---|---|---|
| Comparative Ex. 1 | AN 45.4 g<br>MAN 45.4 g<br>MAA 109.2 g<br>EGDMA 0 g | Molar Ratio 0.5:1<br>0.00 mol % | Isooctane 60 g | Normal Thermally Foamable microsphere is not Obtained (Formed into a Polymer Lump in the middle of Polymerization). | | | | |
| Comparative Ex. 2 | AN 45.4 g<br>MAN 45.4 g<br>MAA 109.2 g<br>EGDMA 2.72 g | Molar Ratio 0.5:1<br>0.49 mol % | | Normal Thermally Foamable microsphere is not Obtained (Formed into a Polymer Lump in the middle of Polymerization). | | | | |
| Comparative Ex. 3 | AN 66.6 g<br>MAN 66.6 g<br>MAA 66.6 g<br>EGDMA 0 g | Molar Ratio 1.3:1<br>0.00 mol % | | Normal Thermally Foamable microsphere is not Obtained (Formed into a Polymer Lump in the middle of Polymerization). | | | | |
| Comparative Ex. 4 | AN 66.6 g<br>MAN 66.6 g<br>MAA 66.6 g<br>EGDMA 2.86 g | Molar Ratio 1.3:1<br>0.48 mol % | | Normal Thermally Foamable microsphere is not Obtained (Formed into a Polymer Lump in the middle of Polymerization). | | | | |
| Comparative Ex. 5 | MAA 200 g | 0:1 | | Normal Thermally Foamable microsphere is not Obtained (Formed into a Polymer Lump in the middle of Polymerization). | | | | |
| Comparative Ex. 6 | MAA 200 g | 1:0 | | 47 | Not Foamed. | | | 200 |
| Comparative Ex. 7 | MAN 132 g<br>MAA 68 g<br>EGDMA 2.72 g | Molar Ratio 2.5:1<br>0.50 mol % | | 50 | 169 | 173 | 1.1 | *2 |
| Comparative Ex. 8 | AN 67 g<br>MAN 31 g<br>MMA 2 g<br>DEGDMA 1.5 g | 0.35 mol % | Isopentane 1 g<br>Isooctane 13 g<br>Isododecane 16 g | 49 | Non Heat-Treated<br>204<br><br>After Heated at 170° C. for 2 minutes<br>135 | Non Heat-Treated<br>209<br><br>After Heated at 170° C. for 2 minutes<br>194 | Non Foamed<br><br><br><br>8.3 | *5<br><br><br><br>*5 |

*1: 230° C.,
*2: 220° C.,
*3: 210° C.,
*4: 200° C.,
*5: 190° C.

As is clear from the results shown in "Table 1" above, in each Example of the thermally foamable microsphere of the present invention, the difference of the expanding starting temperature and the maximum expansion temperature was large. More specifically, the differences of the expanding starting temperature and the maximum expansion temperature in each Example were as follows: Example 1: 22° C., Example 2: 28° C., Example 3: 84° C., Example 4: 80° C., Example 5: 55° C., Example 6: 70° C., Example 7: 65° C., Example 8: 80° C., Example 9: 28° C., Example 10: 74° C., and Example 11: 70° C. This clarifies that the thermally foamable microsphere of the present invention is excellent in the heat resistance.

Moreover, each Example of the thermally foamable microsphere of the present invention has a high expansion ratio. In addition, as shown in Examples 1 and 16, even after heat treated, the expanding starting temperature did not lower, the foaming behavior did not change, and a stable formability was maintained (see Tables 1 and 2, and FIG. 1).

Furthermore, the thermally foamable microsphere of the present invention showed less yellowing at the time of heating. Moreover, in each Example, aggregation did not occur in the middle of polymerization, and thus the thermally foamable microsphere was successfully produced stably.

In contrast, in Comparative Examples 1 and 2 of the monomer mixture in which acrylonitrile was added to methacrylonitrile and methacrylic acid, the mixture was formed into a polymer lump in the middle of polymerization, and thus a normal thermally foamable microsphere was not obtained (see Table 4). Moreover, in Comparative Example 7 in which ethylene glycol dimethacrylate as a cross-linkable monomer was added, the difference between the expanding starting temperature and the maximum expansion temperature was as small as about 4° C. and the expansion ratio also sharply decreased at 220° C. (see Table 4).

Furthermore, in Comparative Example 8, the expanding starting temperature noticeably decreased when the thermally foamable microsphere was not heated and after the thermally foamable microsphere was heated at 170° C. for 2 minutes, and then the foaming behavior sharply changed (see Table 4 and FIG. 2).

INDUSTRIAL APPLICABILITY

The present invention can be used as a technique of producing a thermally foamable microsphere which is excellent in heat resistance and has a high expansion ratio. Making good use of its expandability, the thermally foamable microsphere of the present invention is used as a filler for a paint for automobiles and the like, a foaming agent for wallpaper or foaming ink (for applying relief patterns to T-shirt and the like), a shrink-preventing agents, etc. Moreover, utilizing the volume increase property caused by the foaming, the thermally foamable microsphere of the present invention is used as an additive for the purpose of reducing the weight of polymeric materials such as a synthetic resin (thermoplastic resin, thermosetting resin) and rubber, a paint and various materials making them porous and imparting various functionalities. In particular, the present invention contributes to reducing the weight of interior members or tires of automobiles. Furthermore, the thermally foamable microsphere of the present invention can be suitably used for the fields of a paint, wallpaper, and ink, which are requiring surfaceness and smoothness. The thermally foamable microsphere of the present invention is excellent in processability, and therefore can be suitably used for the fields requiring processing, such as kneading, calendering, extruding, and injection molding.

BRIEF DESCRIPTION OF DRAWINGS

FIG. 1 is a view illustrating changes (foaming behavior) in the degree of expansion between at the expanding starting temperature and at the maximum expansion temperature of a thermally foamable microsphere according to Example 16.

FIG. 2 is a view illustrating changes (foaming behavior) in the degree of expansion between at the expanding starting temperature and at the maximum expansion temperature of a thermally foamable microsphere according to Comparative Example 8.

FIG. 1
1. Foaming behavior before and after heat treatment (Example 16)
2. Degree of expansion
3. Temperature (° C.)
4. Non heat-treated
After treated at 180° C. for 10 minutes FIG. 2
1. Foaming behavior before and after heat treatment (Comparative Example 8)
2. Degree of expansion
3. Temperature (° C.)
4. Non heat-treated
After treated at 170° C. for 2 minutes

The invention claimed is:

1. A thermally foamable microsphere, comprising:
a foaming agent; and
an outer shell encapsulating the foaming agent, the outer shell formed of a copolymer having a polymethacrylimide structure, wherein the copolymer is obtained by polymerizing a mixture of polymerizable monomers, the polymerizable monomers comprise methacrylonitrile and methacrylic acid in a total weight of 90 to 100% by weight, in which a molar ratio of methacrylonitrile to methacrylic acid is 1:9 to 9:1, and wherein the polymerizable monomers further comprise 10% by weight or less of an additional polymerizable monomer or monomers, the additional monomer or monomers comprise acrylonitrile, and the weight-% ratio of acrylonitrile to methacrylonitrile is 0:55 to 10:49.5,
wherein the thermally foamable microsphere exhibits a b* value, and the b* value after heating at 240° C. for 2 minutes is 35.4 or lower.

2. The thermally foamable microsphere according to claim 1, wherein the thermally foamable microsphere exhibits a b* value, and the b* value after heating at 240° C. for 2 minutes is 24 or lower.

3. The thermally foamable microsphere according to claim 1, wherein the thermally foamable microsphere exhibits a b* value, and the b* value after heating at 240° C. for 2 minutes is 23 or lower.

4. The thermally foamable microsphere according to claim 1, wherein the additional polymerizable monomer or monomers comprise at least one additional monomer having a carboxyl group.

5. The thermally foamable microsphere according to claim 4, wherein the additional polymerizable monomer or monomers comprise at least one additional monomer having a carboxyl group selected from the group consisting of acrylic acid, itaconic acid, crotonic acid, maleic acid, maleic anhydride, fumaric acid, and citraconic acid.

6. The thermally foamable microsphere according to claim 1, wherein the molar ratio of methacrylonitrile to methacrylic acid is 1:1 to 9:1.

* * * * *